United States Patent [19]

Maier

[11] Patent Number: 5,156,523
[45] Date of Patent: Oct. 20, 1992

[54] COUPLING FOR FEEDING A HEAT-EXCHANGE MEDIUM TO A ROTATING BODY

[75] Inventor: Erich Maier, Heidenheim, Fed. Rep. of Germany

[73] Assignee: Christian Maier GmbH & Co. Maschinenfabrik, Heidenheim, Fed. Rep. of Germany

[21] Appl. No.: 655,319

[22] Filed: Feb. 12, 1991

[30] Foreign Application Priority Data

Feb. 23, 1990 [EP] European Pat. Off. ........ 90103521.2

[51] Int. Cl.$^5$ ............................................... F01D 5/00
[52] U.S. Cl. .................................. 415/175; 415/177; 415/180; 285/41; 277/22
[58] Field of Search ................... 415/175, 177, 180; 285/41, 276; 277/22

[56] References Cited

U.S. PATENT DOCUMENTS

| | | | |
|---|---|---|---|
| 2,687,096 | 8/1954 | Armacost | 415/180 |
| 3,169,939 | 7/1965 | Erbe et al. | 415/180 |
| 3,211,471 | 10/1965 | Darlington | 285/41 |
| 3,477,729 | 11/1969 | Hershey | 277/22 |
| 4,466,619 | 8/1984 | Adams | 277/22 |
| 4,605,249 | 8/1986 | Klievoneit et al. | 285/276 |
| 4,775,293 | 10/1988 | Boster | 415/180 |
| 4,789,188 | 12/1988 | Seabrook et al. | 285/276 |
| 5,035,448 | 7/1991 | Seabrook et al. | 285/276 |

*Primary Examiner*—Thomas E. Denion
*Attorney, Agent, or Firm*—Herbert Dubno; Andrew Wilford

[57] ABSTRACT

A coupling for feeding a heat-exchange fluid between a stationary supply and a rotating body comprises a tubular rotor shaft fixed to the rotating body and rotatable about and centered on an axis and a nonrotatable housing fixed stationarily adjacent and surrounding the body. This housing is provided with an inlet connected to the supply and is formed with a passage permitting fluid communication between the supply and the body through the shaft. At least one roller bearing rotationally supports the shaft in the housing and outer and inner seals axially flanking the bearing define an annular substantially closed chamber containing the bearing and each seal between the housing and the shaft. The inner seal has an inner side exposed to the fluid and the outer seal has an outer side exposed to the surrounding atmosphere. A coolant is circulated through the chamber.

7 Claims, 1 Drawing Sheet

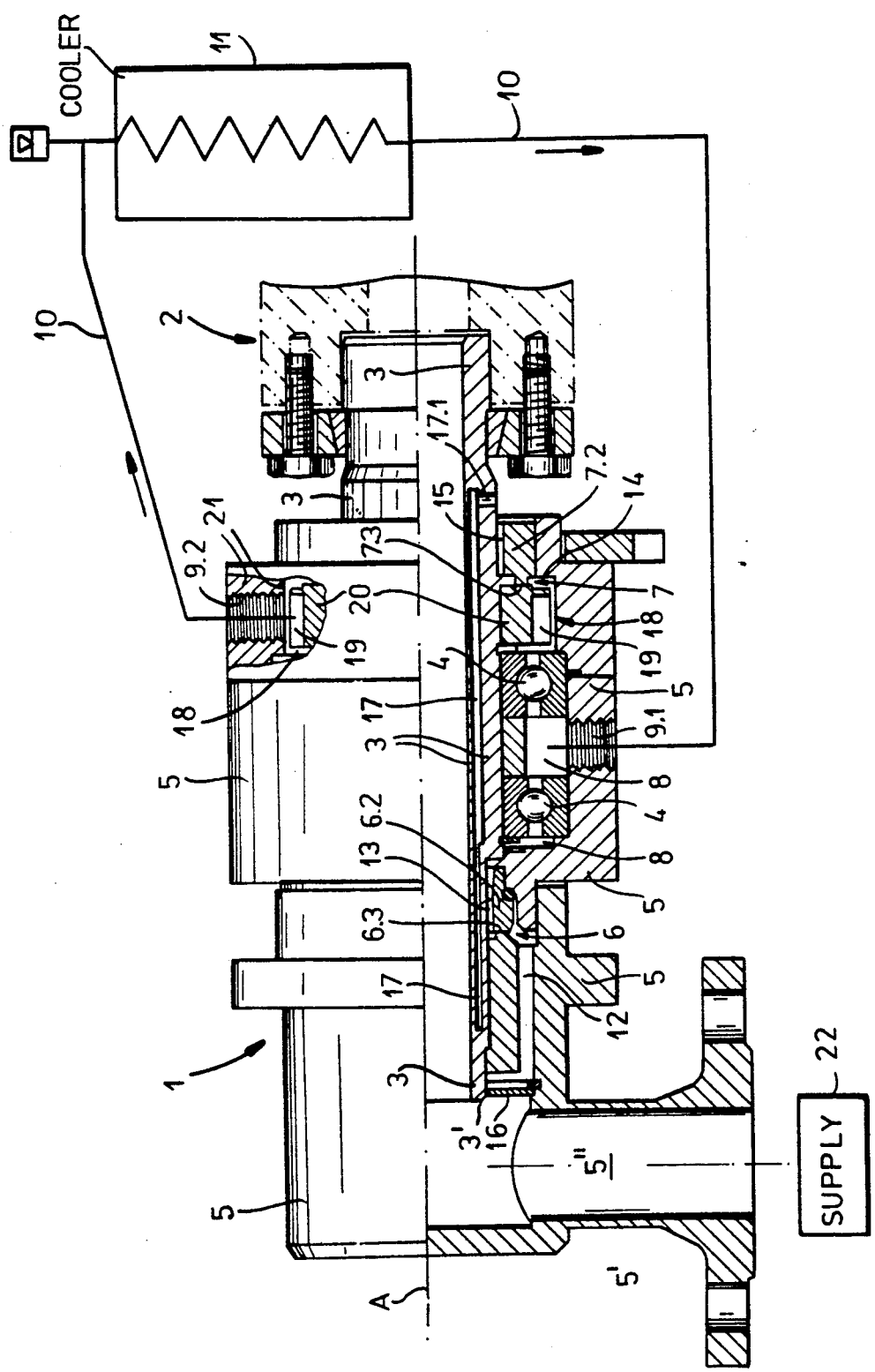

COUPLING FOR FEEDING A HEAT-EXCHANGE MEDIUM TO A ROTATING BODY

FIELD OF THE INVENTION

The present invention relates to a coupling for feeding a heat-exchange medium to a rotating body. More particularly this invention concerns an arrangement for feeding a very hot liquid from a stationary source to a rotating drum or roller.

BACKGROUND OF THE INVENTION

A heating roller or drying drum is typically supplied with its heat-exchange medium, e.g. hot oil, via a coupling provided at the pivot axis of the roller. To this end the body in question normally has a tubular shaft extending along its pivot axis and forming a passage that connects in the coupling to a passage that in turn is connected to the supply of the heat-exchange fluid. The coupling itself has a housing that is generally stationary or at least not rotatable, and a bearing is provided that supports the shaft in the housing for rotation about its axis.

Leakage is typically prevented by providing a slide-type seal that is located to the side of the bearing toward the hot source of liquid. The bearing itself is normally a standard roller or plain bearing that is packed in heat-resistant grease.

Any leakage in such a coupling will, however, drive the heat-exchange medium through the bearing. Not only does the hot liquid heat the bearing and, possibly, drive out its lubrication, but it frequently can combine with atmospheric oxygen to damage the bearing. The seal itself can also be damaged by the leakage of the medium through it and its reaction with atmospheric oxygen.

OBJECTS OF THE INVENTION

It is therefore an object of the present invention to provide an improved coupling for connecting a rotating body to a source of a heat-exchange medium to be supplied to the body.

Another object is the provision of such an improved coupling for connecting a rotating body to a source of a heat-exchange medium to be supplied to the body which overcomes the above-given disadvantages, that is which positively protects the bearing and seal.

SUMMARY OF THE INVENTION

A coupling for feeding a heat-exchange fluid between a stationary supply and a rotating body comprises a tubular rotor shaft fixed to the rotating body and rotatable about and centered on an axis and a nonrotatable housing fixed stationarily adjacent and surrounding the body. This housing is provided with an inlet connected to the supply and is formed with a passage permitting fluid communication between the supply and the body through the shaft. At least one roller bearing rotationally supports the shaft in the housing and outer and inner seals axially flanking the bearing define an annular substantially closed chamber containing the bearing and each seal between the housing and the shaft. The inner seal has an inner side exposed to the fluid and the outer seal has an outer side exposed to the surrounding atmosphere. A coolant is circulated through the chamber.

Thus the coolant lubricates the bearings. The cooled bearing therefore not only has an increased service life, but also any chemical reaction with the lubricant is ruled out. Furthermore the bearings do not have to be designed for very high temperatures and the heat expansion incurred thereby.

Keeping the bearing cool not only has the obvious effect of improving its operation, but also reduces any chemical action in it. Since the coolant circulated through the chamber is positively cooled, it is not necessary to employ expensive heat-resistant lubricants for these critical bearings. In fact the same oil as is used for the heat-exchange medium can be used as the lubricant so that minor leakage at the inner seal becomes unimportant.

In addition the lubricating oil keeps the oxygen in the ambient air from the main or inner seal. As a result the heat-exchange medium cannot react with oxygen and damage the seal if same leaks.

According to a particular feature of the invention the inner side of the inner seal, that is its side exposed directly to the heat-exchange medium, is its radial outer side so that centrifugal force works against radial inward leakage through this inner seal. In addition the shaft and rotor form inward of the inner seal an inner chamber and the coupling has a shield at an inner end of the inner chamber permitting limited flow of the heat-exchange fluid into the inner chamber. Thus the heat-exchange oil contacting the inner side of the inner seal is already somewhat cooler than that flowing through the coupling, as it is caught in the backwater formed by the shield.

The rotor according to the invention is formed with an annular chamber extending axially past the inner and outer seals and the bearing. In addition an impeller can be fixed on the rotor. As a result the rotation of the shaft itself pumps the lubricant/coolant oil through the bearing chamber and through the radiator that can serve as cooler, avoiding any necessity of providing a separate pump.

The housing forms around the impeller an annular chamber provided with an outlet port connected to the circulator and the impeller is provided with radially projecting vanes in the chamber. This annular chamber forms static insulation that acts like a thermosyphon to further keep the bearings cool. Of course if no impeller is formed on the rotor, a separate coolant pump is provided.

BRIEF DESCRIPTION OF THE DRAWING

The above and other objects, features, and advantages will become more readily apparent from the following, reference being made to the accompanying drawing whose sole FIGURE is a partly diagrammatic axial section through the assembly according to this invention.

SPECIFIC DESCRIPTION

As seen in the drawing a coupling 1 is used to feed a heat-exchange medium, typically a hot organic or even inorganic oil, between a body indicated at 2 and a supply indicated schematically at 22. The body 2 has a cylindrically tubular shaft 3 centered on an axis A which rotates with the body 2 about this axis A. The coupling 1 has an inlet fitting 5 having a lateral flanged connector 5' forming a passage 5" by means of which the fluid from the supply 22 can pass into the tubular shaft 3 and thence into the body 2. A pair of standard axially spaced roller bearings 4 support the shaft 3 in the housing 5 for rotation about the axis A. Flow can be in either direction through the passage 5", there normally being such a coupling 1 at each end of the body 2 for axial flow through the body 2.

An inner seal 6 and an outer seal 7 axially flank the bearings 4 and define a chamber 8 containing these bearings 4. The inner seal 6 comprises a part 6.1 fixed on the shaft 3 and a part 6.2 fixed on the housing 5 and touching the part 6.1 at an interface 6.3. The outer seal 7 comprises a part 20 fixed on the shaft 3 and a part 7.2 fixed on the housing 5 and touching the part 20 at an interface 7.3.

The housing 5 is formed on its lower side between the bearings 4 with an intake port 9.1 and on its upper side axially level with the part 20 with an outlet port 9.2 opening in an annular chamber 18 at a cylindrical inner surface 21 of the housing 5. A cooler 11 is connected via conduits 10 to the ports 9.1 and 9.2 to circulate a coolant/lubricant liquid therethrough. The part 20 is here formed with radially projecting fins or vanes 19 so that it acts like an axial-input radial-output impeller forcing the coolant liquid out the port 10 and drawing it in through the port 9.1.

The inner end of the rotor forms with the housing 5 a compartment or chamber 12 to which the heat-transfer liquid can gain access by moving past a shield 16. Thus this chamber 12 will be filled with the heat-transfer liquid, but since the shield 16 prohibits free exchange of this liquid with the liquid passing along the passage 5", this liquid will be substantially cooler in the chamber 12. In addition any large particles or the like will not get past the shield 16 so that they cannot damage the bearings 4.

In order to further block heat transfer from the hot liquid or vapor inside the tubular shaft 3 and the bearings 4 and other structure, the shaft 3 is formed with an empty annular passage or chamber 17 that extends axially up to or past the interfaces 6.3 and 7.3 and that opens radially externally at 17.1.

I claim:

1. A coupling for feeding a heat-exhange fluid between a stationary supply and a rotating body, the coupling comprising:
   a tubular rotor shaft fixed to the rotating body and rotatable about and centered on an axis;
   a nonrotatable housing fixed stationarily adjacent and surrounding the body, the housing being provided with an inlet connected to the supply and formed with a passage permitting fluid communication between the supply and the body through the shaft;
   at least one roller bearing rotationally supporting the shaft in the housing;
   outer and inner seals axially flanking the bearing, defining an annular substantially closed chamber containing the bearing, and each sealing between the housing and the shaft, the inner seal having an inner side exposed to the fluid and the outer seal having an outer side exposed to the surrounding atmosphere, the housing being formed with a pair of spaced-apart ports opening into the chamber;
   means including a cooler adjacent the coupling for cooling a fluid in the cooler;
   respective conduits connecting the cooler to the ports; and
   means in the housing for circulating a coolant fluid through the chamber, through the conduits, and through the cooler.

2. The coupling defined in claim 1 wherein the inner side of the inner seal is its radial outer side.

3. The coupling defined in claim 1 wherein the shaft and rotor form inward of the inner seal an inner chamber, the coupling further comprising
   a shield at an inner end of the inner chamber permitting limited flow of the heat-exchange fluid into the inner chamber.

4. The coupling defined in claim 1 wherein the rotor is formed with an annular chamber extending axially past the inner and outer seals and the bearing.

5. The coupling defined in claim 1 wherein the means for circulating includes an impeller fixed on the rotor.

6. The coupling defined in claim 5 wherein the housing forms around the impeller an annular chamber provided with an outlet port connected to the circulating means.

7. The coupling defined in claim 6 wherein the impeller is provided with radially projecting vanes in the chamber.

* * * * *